Figure 5:

Sept. 10, 1963           G. K. CULP           3,103,242
SUPPLEMENTAL TRACTION DEVICE
Filed Jan. 3, 1961           2 Sheets-Sheet 1
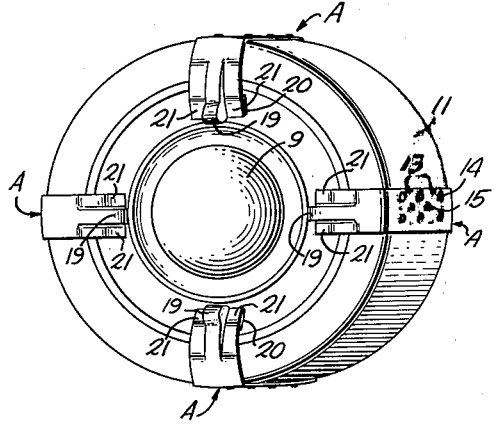
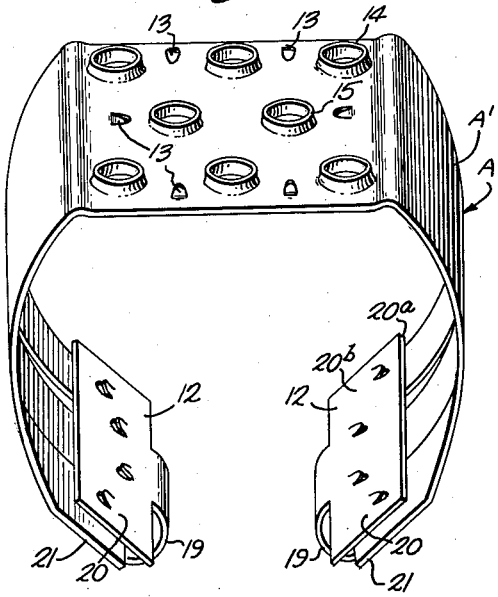
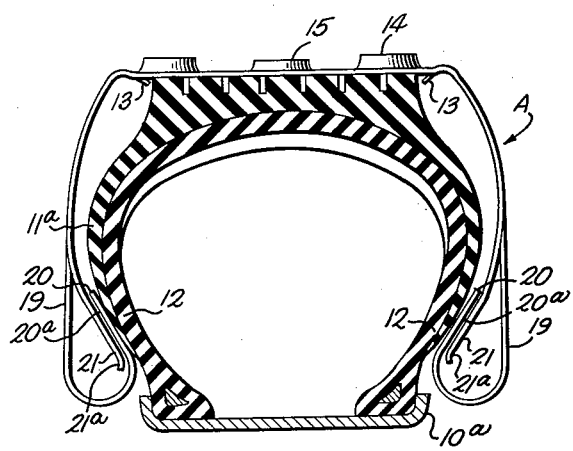
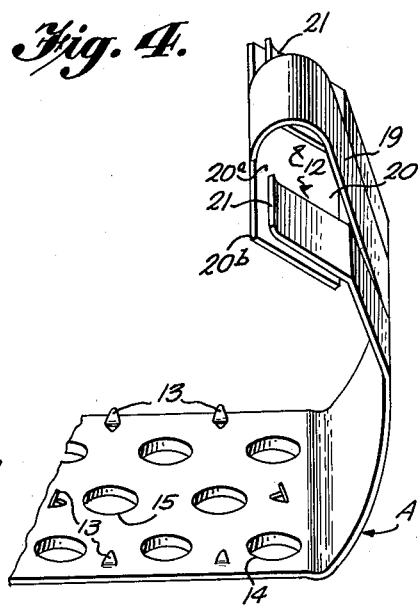

Sept. 10, 1963 G. K. CULP 3,103,242
SUPPLEMENTAL TRACTION DEVICE
Filed Jan. 3, 1961 2 Sheets-Sheet 2

3,103,242
SUPPLEMENTAL TRACTION DEVICE
George K. Culp, Newton County, Mo., assignor to
Jack Manning, Joplin, Mo.
Filed Jan. 3, 1961, Ser. No. 80,186
12 Claims. (Cl. 152—230)

This invention relates to supplemental traction devices for all manner of pneumatic, rubber tired, power driven, commercial and passenger vehicle wheels, being uniquely adapted for quick on and off detachable association with the tire and when pushed in place thereon, provides complete and positive traction in all directions, to produce a one piece, flexible steel, solid sure footing for the safe handling of the vehicle under all conditions of ice, snow, mud or combinations thereof. The ultimate solution for controlling and nullifying the deadly car skid.

Another long desired feature, which my invention provides, is the simplicity of instant removal by peeling off with the bare hand when no longer needed, thus saving the full protective effect of the rugged steel tread design against excessive wear, to provide long mileage and much repeated usage. Also, to thus free the vehicle of the speed reducing incumbrance of such supplemental devices, when no longer needed.

My invention is a radical departure from all previous half-measures to accomplish the quick recovery of the spinning wheel to a state of stable, controllable, and safe driving, when slippery roads and deep snow are encountered.

When the conventional rubber, non-skid tire tread, including snow tires, become habitually helpless on wet icy pavement, slick mud or thin snow or slime, my device instantly restores true traction to the driven spinning wheel and safe driving to the previously helpless driver.

The main object of this invention is to provide a supplemental traction device of novel design, construction and material, which when simply pushed on to the vehicle tire (truck or passenger) with the bare hands, it instantly and permanently snaps on, due to a unique clamping and hugging, spring steel tempered action, with over-bent, power legs and barb and burr means for automatic fixing and locating it solidly in its transverse position to the tire, with inherent self-contained automatic means for locking it on and for presenting to the slick road surface, a supplemental steel tread of rasps and various cutting and scraping projections and surfaces, to thus forestall any spinning, sliding, weaving or uncontrollable lateral movements of the driven wheel. It actually retreads the thus covered section of the tire's rubber tread, with a new super-rugged, spring steel, non-skid tread of complete dependability against all slick road hazards.

The resultant locked on mechanical fixation is that no amount of centrifugal or torque forces, set up by the spinning wheel, can throw it or loosen its grip on the tire side-wall yet it can be instantly detached by the mere flexing out and up of its over-bent spring body tension with the bare hand. Anyone capable of driving a car can put on or remove the device in a few seconds.

The fact that my invention can be put on with the bare hands after a hazardous driving condition of snow or ice is encountered, without tools, fuss or muss, is its greatest virtue. Even a woman driver can be safely on her way in minutes and she cannot lose the device from spinning forces or sticky mud.

Finally, the one-piece, flexible, overbent spring construction, in any suitable material and the absence of parts, fittings, tools and accessories makes it simple to manufacture in great quantities at low cost, once extensive tooling is accomplished. Its long life and utter convenience and safety makes it inexpensive to own and mandatory to use.

Here I wish to emphasize and describe the important and novel feature of material and treatment thereof, used in the fabrication of my invention.

I start with mild heat treatable flat steel sheet of special quality analysis—viz: cold rolled annealed spring steel of any hand flexible gauge, such as .042 gauge—and a blanking and sizing tool steel die, thence through the progressive stages of regular punch press operations with special tools and dies for sizing, forming, bending, drawing, trimming, punching, piercing, upsetting, overbending and finishing. Then after all stages and pressing passes are completed, the heat tempering to fine spring steel hardness with permanent overbent clockspring tension is readily accomplished.

All reference to tool steel dies, punching, upsets, overbending, pressing, drawing and forming of steel sheet procedures will be readily understood by those skilled in the art involved, for which reason, further illustrations and technical descriptions of production procedures are omitted. These dies are made from any of a number of high quality tool steels, readily available, such as Lehigh-H, high carbon, high chromium, air hardened tool steel—a Bethlehem Co. product. These progressive dies are hardened to approximately Rockwell C-61 hardness to turn out thousands of pieces per day with minimum repair. Any conventional machine press is used.

For the same reason, all details incident to heating, quenching and soaking for proper temper and tension of the finished steel structure is handled by reference only. All steel mills furnish complete tempering instructions for their products.

Figure 9:
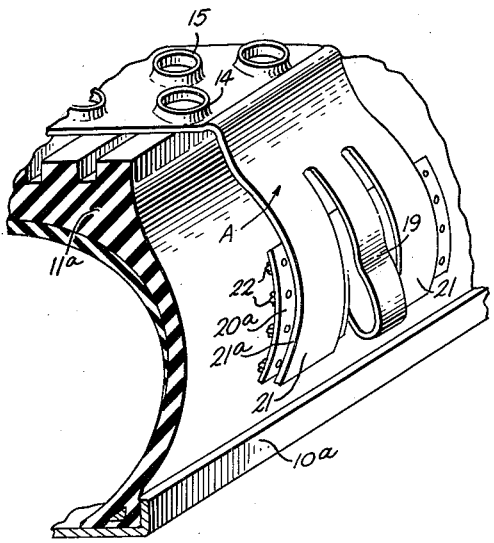
Figure 10:
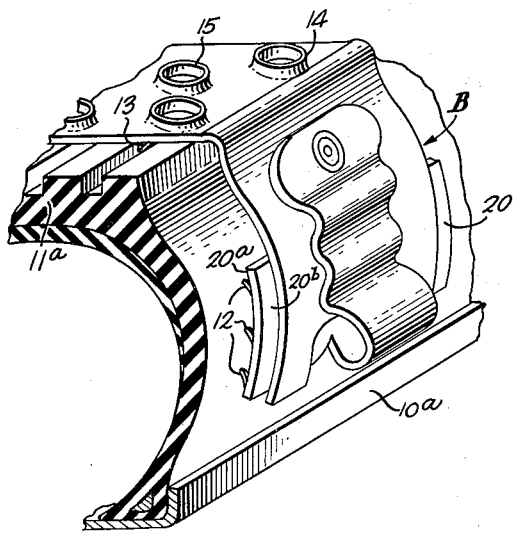

And again, for the same reason, no attempt is made here to detail the technical and practical procedures for formulating heating, casting and pressure molding of suitable plastic material, shown in FIG. 10, as a modification and alternative for and of my original invention in spring steel, FIGS. 1—2—3—4 and 9.

This alternative, a molded suitable plastic casting formulation, is used with the purposeful results and certain desirable achievements with side effects and texture not obtainable in steel.

The rapidly increasing number of new municipal ordinances, in ice and snow areas, involving the compulsory use of chains or approved snow tires, tends to give my invention a predominant position and official importance, in the use of motor driven vehicles in restricted zones during snow and ice storms, after notice of emergency is officially broadcast and driving restrictions are declared. Thus, I finish the invention in fluorescent orange (reddish yellow) color to identify the devices in use on moving vehicles, to allow official inspection while in motion.

One of the principal features of my invention is the new and improved and simply contrived senior tread means, which is inherently resident in the permanent design and construction, for positively engaging the road surface with a series of upset, struckout or extruded steel tread rasps of multiple points, curves and angles, to instantly stop all skidding and swaying action, when slick road surface is encountered.

As a further benefit to prolonged usage and mileage of the device, I have provided an alternate set of junior steel, non-skid tread projections and surfaces of lesser height, which remain in a reserved state of newness and sharpness until the senior set of steel rasps or burrs wear down from excessive usage and abrasion, when the junior or alternate set comes finally into constant and direct contact with the road surface, thus forming a new set of anti-skid means, with resultant continuing and extended useful life and safety of the device.

A further dominant feature and of paramount importance to the invention is the simple but positive self-locking but harmless, non-lacerating action of the steel, struckout, locking barbs and burrs, which when the device is pushed into place on the tire, automatically and instantly imbed themselves, without piercing, into the lower middle tapering sidewall rubber covering, permitting the inner surface of the adjacent steel barb or burr shoe area of the device to hug tightly the adjacent outer rubber sidewall surface of the tire casing in a snug cheek-to-cheek relationship.

Here it will be noted, by referring to attached drawings, that freedom of the normal flexing and bulging movement of the middle side-wall area of the tire, without disturbing these locking barb or burr means, is accomplished by the widening of the intermediate area of the device with greater radius to allow full clearance for the freedom of movement, so that it is impossible for the bulging or flexing of the tire side-wall to impinge and push out against the inner surface of the main device, between the lower locking barb or burr foot area and the upper under tread barb or burr area, which would tend to dislodge or cause unwanted restlessness of the imbedded barbs or burrs, to thus disturb and weaken their totally imbedded locking on action in the lower middle side-wall rubber body and tread. A further provision is made, for full freedom of movement of the main body of the device in action without disturbance of the locking barbs or burrs, by floating the entire barb or burr foot area by means of a secondary spring struck out from the main body structure. This treatment permits a shuttlecock action of the power legs of the upper portion of the device to thus free the barb or burr foot area of all working and flexing movements of the balance of the structure.

As every experienced automobile tire engineer knows, there are uncontrollable forces rampant in the working tire structure in action, of stress, strain, expansion, contraction, compression, lumping, bulging, twisting, squirming, wiggling, with profile distortion set up by the constant shape conformation of the pneumatic tire tread and upper side-wall from round to flat to round in all degrees of change under load, torque, speed, varying air pressures, bounces, lateral sway and braking drag, with ever present centrifugal forces constantly pulling at the locking on means. It is the arresting, quieting, controlling and finally over-riding of these violent conflicting forces by my device, for the convenient and instant successful prevention of any loss of traction when ice, snow, frost, slime or mud is encountered that constitutes the essence of my invention. It embodies a unit structure so simple and yet so strong and completely dependable, that the driver of any power driven, pneumatic tired vehicle can, with the bare hands and without tools, strain or muss, in a few seconds push it on and go safely or peel it off and go swiftly. Surely Utopia for the millions of motorists, whose lives, limbs and property are immediately in jeopardy when icy slick roads are encountered, where only chains could be really depended upon previously and inconvenience forbid their general use.

My invention, entirely embodied and complete in one piece, by its firm, spring tempered, overbent flexible steel clamping, fixing, hugging, holding, and locking action, with full sectional substitute inherent steel rasp tread, departs completely from the former practices of draping on, tieing on, lacing or buckling on or screw tightening of the numerous non-skid effects, devices and contrivances now on the market.

The number of devices per wheel, of my invention, depends upon the type of vehicle, owner temperament and area weather conditions. Usually 3 to 4 spaced equally around the tire provides ideal protection, rhythm and good braking means.

With the above and other objects in view, one form of the invention is set forth in detail and clearly illustrated in the accompanying drawings:

FIG. 1 is a general perspective view of a tire casing mounted on a wheel, illustrating a number of these traction devices made in accordance with one embodiment of the invention and depicting their application to a tire mounted wheel.

FIG. 2, a perspective view of the device mounting position and push on relation to the mounted tire.

FIG. 3, a cross sectional view taken through the tire equipped rim, showing the same traction device applied about the casing, depicting the self-locking, non-lacerating, struckout multiple steel barbs or burrs, for the holding and locking units disposed at lower middle side-wall and locating and fixing, disposed similar multiple units at upper underside tread.

FIG. 4, a sectional inverted view of same traction device A.

FIG. 5, a cross section view of senior tread non-skid means.

Figure 6:

FIG. 6, a cross section view of alternate junior tread non-skid means of lesser height.

Figure 7:

FIG. 7, same as FIG. 5 but showing a plastic senior or junior tread insert cleat as an alternate long mileage means.

Figure 8:

FIG. 8, same as FIG. 5 but showing a fired on porcelain, or any other wear or abrasive resisting enamel or coating, covering entire outer tread area of the device, as an alternate extended mileage means.

FIG. 9, a sectional perspective view of the secondary floating spring, floated barb or burr foot, shuttlecock and locking on area complex of same traction device A.

FIG. 10, a sectional perspective view of an alternative form of same traction device designated as an entirety by the letter B but shown and described as a one piece plastic molding complex in place of the pressed spring steel structure A.

The drawings disclose an automobile wheel 9 having a flanged tire rim 10 with a pneumatic tire casing 11 applied thereto.

To gain additional traction for the original rubber tire casing 11, there is provided by the several elements and components of the invention illustrated in FIGS. 1 to 4 and 9 inclusive, a supplemental traction device designated as an entirety by the letter A.

This traction device is in the form of a spring cuff-like clamp of sheet spring steel, having an inverted U shape main body A' all in one piece and overbent to provide a snug live-spring clamping, hugging and locking on action, with multiple struckout barbs 12 or burrs 22, FIG. 9, for locking and holding the entire device flexibly secure in transverse position to the tire casing, with similar struckout barb like projections 13 on the underside tread area to locate and fix and then lock the device from walking or shifting or moving lineally under torque and braking forces likewise holding firm against the constant pulling and tugging of the senior and junior non-skid steel tread extruded projections 14 and 15, as they bite and claw the road surface to hold steady against the deadly skid. Here and now it will be seen that rigid automatic mechanical locking on and fixing steel means, such as barbs and burrs, are depended upon and resorted to for proper, safe performance of the device, since frictional pressure alone between the metal device and the sidewall rubber of the tire could not possibly prevail against the rampant forces that constantly and actively reside in a working tire casing.

FIG. 9, a sectional perspective detailed view of the spring floated, locking barb or burr foot 20 having a front face 20a and a rear face 20b, secondary floating struckout spring 19 being the operable connection between the body A' and the foot 20 and shuttlecock action area, which complex interrelationship provides complete independent and free movement of the foot 20 relative to the body A'.

It is obvious that there can be no uniformity of flexing action between two such widely varying and dissimilar substances and forms, as a working rubber tire structure and an all steel non-skid, conjoined tread and mounting components so a compensating means must be provided to compose and contain the conflictions. Hence, the spring floated barb foot accommodating means 20 allows full up and down, forward and back and in and out movements of the power legs 21 as the foot means perform their function of tire hugging and fitting.

Here it will be seen, that as the tread area of the device A comes in contact with the road surface, the heretofore round or oval tire tread beneath it begins to flatten and the middle sidewall of the tire starts to bulge outward, forcing device A to tilt and give under the load and torque squirm action thus causing the power leg extremities 21 to move up and down and shift back and forth as a shuttlecock. This movement would tend to disturb the firm locking barbs 12 or burrs 22, if the whole complex of locking on means were not spring floated free by secondary spring 19, freedom of movement of power legs 21 over barb or burr foot 20 is accomplished by the frictional bearing provided by the smooth faces of the outer and inner surfaces of the barb foot 20a and the power legs 21a respectively, the latter sliding over the former, as shown in FIGS. 3 and 9. Here it will be noted, that this unique freedom of movement of power legs 21 up and down and in and out permits the novel feature of automatic size adjustment of the device by extending or compressing floating spring 19 and thus leaving barb foot 20 free to settle and lock on under power leg hugging pressure at its critical location at the center and lower inwardly tapering sidewall area of each tire, as shown in FIGS. 3 and 9. Therefore, without the aforesaid shuttle complex of freedom of movement, automatic size and shape adjustment with full flexibility, there could be no predictable proper performance of the device in meeting, over-riding and composing the constantly varying requirements at hand.

With further reference to the illustrations, the alternative device B, FIG. 10, is in the form of a unified suitable plastic molding complex, embodying all of the essential features and components disclosed and enumerated, described and illustrated in FIGS. 1 to 4 and 9 but substituting a plastic material casting in place of sheet spring steel shown and designated by letter A.

In this connection, various other modifications, changes, forms and rearrangements are contemplated and may obviously be resorted to but in-no-wise departing from the scope, intent and practices of the present invention, which generally stated consists in the matter and manner set forth in the following claims.

Having thus described my invention in detail, I claim:

1. A traction device for use on pneumatic tired, power driven vehicle wheels comprising; a substantially U-shaped body having a base, a plurality of ground engaging projections protruding outwardly from said base, a tire engaging foot disposed within and on each side of said body, gripping means positioned on each foot to frictionally engage the tire, said body slidingly engaging said foot to maintain said foot and gripping means in engagement with said tire, floating biasing means connected between said foot and said body to permit independent movement of said body relative to said foot during flexure movement of the tire.

2. The traction device of claim 1 wherein the sides of the U-shaped body are each bifurcated to form legs slidingly engaging said foot.

3. A traction device for use on pneumatic tired, power driven vehicle wheels, comprising; a substantially U-shaped body having a base, a plurality of ground engaging projections protruding outwardly from said base, legs formed inwardly on the upper end of said body, a foot floatingly positioned within and on each side of said body in sliding engagement with said legs, gripping means positioned on each foot to frictionally engage the tire, biasing means being the sole connection between said body and said foot and maintaining said foot within said body permitting independent movement of said body and said legs relative to said foot.

4. The traction device of claim 3 wherein the body is bifurcated to form pairs of said legs on each side and said biasing means comprises a vertical spring positioned between the legs of each pair of legs.

5. The traction device of claim 4 wherein the gripping means including barbs directed toward said base.

6. The traction of claim 3 wherein the ground engaging means comprises circular rasps.

7. The traction device of claim 3 wherein a plurality of projections protrude inwardly from said base to engage the tire.

8. The traction device of claim 3 wherein the biasing means comprises an undulating wave form vertically extending spring.

9. A traction device for use on pneumatic tired, power driven vehicle wheels comprising: a substantially U-shaped body having a base, a plurality of ground engaging projections protruding outwardly from said base, said body being bifurcated to form pairs of inwardly extending legs on each side of the upper end of said body, a foot floatingly positioned within and on each side of said body in sliding engagement with said legs, gripping means including a plurality of barbs directed towards said base positioned on each foot to frictionally engage the tire, an undulating wave form vertically extending spring connected to said body and said foot and being the sole connection between said foot and said body, said spring being disposed between the legs of each pair of legs whereby the legs of said body move in sliding, foot stabilizing engagement with said foot while maintaining said foot in contact with the tire.

10. The traction device of claim 9 wherein said ground engaging projections are circular and coated with a hard abrasive resistant material.

11. A traction device for use on pneumatic tired, power driven vehicle wheels comprising: a substantially U-shaped body having a base, a plurality of ground engaging projections protruding outwardly from said base, a tire engaging foot operably independent from said body disposed within and on each side of said body, said foot having a front face and a rear face disposed within said body, said front face having gripping means positioned thereon to frictionally engage the tire, floating biasing means connected between said foot and said body to permit independent movement of said body relative to said foot during flexure movement of the tire.

12. A traction device for use on pneumatic tired, power driven vehicle wheels comprising: a substantially U-shaped body having a base, a plurality of ground engaging projections protruding outwardly from said base, a tire engaging foot operably independent from said body disposed within and on each side of said body, gripping means positioned on each foot to frictionally engage the tire, floating biasing means connected between said foot and said body to permit independent movement of said body relative to said foot during flexure movement of the tire.

References Cited in the file of this patent

UNITED STATES PATENTS

| | | |
|---|---|---|
| 1,532,425 | Markwick | Apr. 7, 1925 |
| 2,330,839 | O'Brien | Oct. 5, 1943 |
| 2,530,108 | Whichard et al. | Nov. 14, 1950 |
| 2,660,679 | Hunt | Nov. 24, 1953 |
| 2,871,903 | Minutilla | Feb. 3, 1959 |
| 2,953,182 | Brown | Sept. 20, 1960 |

FOREIGN PATENTS

| | | |
|---|---|---|
| 610,644 | France | June 14, 1926 |
| 107,364 | Austria | Oct. 10, 1927 |
| 191,389 | Switzerland | June 15, 1937 |